United States Patent
Mitsui (10) Patent No.: US 8,144,969 B2
(45) Date of Patent: Mar. 27, 2012

(54) PATTERN EVALUATION METHOD, COMPUTER-READABLE RECORDING MEDIUM, AND MANUFACTURING METHOD OF SEMICONDUCTOR DEVICE

(75) Inventor: Tadashi Mitsui, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 535 days.

(21) Appl. No.: 12/367,273

(22) Filed: Feb. 6, 2009

(65) Prior Publication Data

US 2009/0202140 A1    Aug. 13, 2009

(30) Foreign Application Priority Data

Feb. 7, 2008    (JP) ................. 2008-027625

(51) Int. Cl.
*G06K 9/00* (2006.01)

(52) U.S. Cl. ........ 382/144; 382/145; 382/141; 382/201; 382/291

(58) Field of Classification Search .......... 382/141, 382/145, 147, 149, 199, 201, 203, 286, 291
See application file for complete search history.

(56) References Cited

U.S. PATENT DOCUMENTS

| | | | |
|---|---|---|---|
| 6,683,306 B2 | 1/2004 | Bowley, Jr. et al. | |
| 6,839,470 B2 | 1/2005 | Ikeda | |
| 6,985,626 B2 * | 1/2006 | Mitsui | 382/144 |
| 7,151,855 B2 | 12/2006 | Mitsui | |
| 7,983,471 B2 * | 7/2011 | Kitamura et al. | 382/145 |

FOREIGN PATENT DOCUMENTS

| | | |
|---|---|---|
| JP | 2003-178314 | 6/2003 |
| JP | 2005-098885 | 4/2005 |
| JP | 2006-275952 | 10/2006 |

OTHER PUBLICATIONS

Chui, H. et al., "A New Algorithm for Non-Rigid Point Matching," IEEE Conference on Computer Vision and Pattern Recognition (CVPR), vol. II, pp. 45-51 (1-8), (2000).

* cited by examiner

*Primary Examiner* — Gregory J Toatley
*Assistant Examiner* — Iyabo S Alli
(74) *Attorney, Agent, or Firm* — Finnegan, Henderson, Farabow, Garrett & Dunner, L.L.P.

(57) ABSTRACT

A pattern evaluation method includes: acquiring data of a design pattern for an evaluation pattern to detect a first edge of the design pattern; acquiring an image of the evaluation pattern to detect a second edge of the evaluation pattern; dividing the first edge into first linear parts and first corner parts; performing matching of the first and second edges to obtain correspondence between the first and second edges; dividing the second edge into second linear parts and second corner parts based on the correspondence between the first and second edges; and evaluating the evaluation pattern based on at least one of the second linear parts and the second corner parts.

20 Claims, 6 Drawing Sheets

PATTERN EVALUATION METHOD, COMPUTER-READABLE RECORDING MEDIUM, AND MANUFACTURING METHOD OF SEMICONDUCTOR DEVICE

CROSS REFERENCE TO RELATED APPLICATION

This application claims benefit of priority under 35USC §119 to Japanese patent application No. 2008-027625, filed on Feb. 7, 2008, the contents of which are incorporated by reference herein.

BACKGROUND OF THE INVENTION

1. Field of the Invention

The present invention relates to a pattern evaluation method, a computer-readable recording medium, and a manufacturing method of a semiconductor device.

2. Related Background Art

A method of detecting an edge of an evaluation pattern to evaluate a shape of the pattern is extensively adopted in various industrial fields. For example, in manufacture a semiconductor device, accurately measuring a fine pattern formed by, e.g., a photolithography process, a film forming process, or an etching process is required to manufacture a fine device with an excellent yield ratio. CD measurement using a CDSEM (Critical Dimension Scanning Electron Microscope) has been conventionally extensively carried out as pattern measurement.

In recent years, to satisfy demands for realization of high performances or high functions of devices, not only sizes of patterns are miniaturized but also shapes of the same are becoming more complicated. To evaluate each of these patterns having complicated shapes, a shape of the entire pattern must be measured as different from the conventional CD measurement that measures a specific part of the pattern. For example, a technique of superimposing a design pattern obtained based on design data on an evaluation pattern to measure a difference between these patterns has been already carried out. However, as different from general industrial products, a pattern shape of a semiconductor device often greatly deviates from design data. In particular, since a corner part of the pattern is apt to be affected by an optical resolution of a pattern exposure device, forming such a right-angle part as that in the design pattern is difficult, and a rounded shape is generally obtained. Therefore, when measuring a difference in shape between an evaluation pattern and a design pattern, an influence of a corner part on a size is different from that of any other part on the same. The number of the corner parts in the pattern varies depending on complexity of the pattern, and hence a magnitude of the different is dependent on complexity of the pattern. This means that using the difference between the evaluation pattern and the design pattern is inappropriate to evaluate, e.g., a line pattern or a pattern in which line patterns are intricately coupled by using the same index. Therefore, corner parts of the pattern must be excluded from measurement of the difference when measuring the difference.

Here, achieving the above-explained object is not impossible by specifying a range of a specific part (the corner part) based on an operator's assist, but extracting each corner part of an actually formed semiconductor pattern by using human eyes is difficult as different from design data consisting of straight lines. Therefore, not only an accurate result cannot be obtained, but also a problem that a large individual difference occurs in accordance with a proficiency degree of each operator arises. Therefore, there can be also considered, e.g., an automation technique of using an image processing technology based on a computer to detect an edge of a pattern, calculating a local curvature thereof, and separating linear parts and corner parts in the pattern based on this curvature, thereby requiring no assist of an operator (Japanese patent laid open (kokai) 2005-098885).

However, according to the above-explained technique, if even a part of a pattern that should be evaluated as a linear part under normal conditions is deformed due to various processes, e.g., exposure conditions and a curvature is thereby locally increased, there can be considered a case that a contribution as a corner part to its difference is eliminated. Further, when exposure conditions are intentionally exerted at predetermined intervals to evaluate a pattern, since a pattern deformation degree differs in accordance with each pattern, a proportion of linear parts in a pattern edge differs between a largely-deformed pattern and a less-deformed pattern in the above-explained automation technique. As a result, there occurs a problem that using the difference as an evaluation index for a pattern deformation degree is difficult.

SUMMARY OF THE INVENTION

According to a first aspect of the present invention, there is provided a pattern evaluation method comprising:

acquiring data of a design pattern for an evaluation pattern to detect a first edge of the design pattern;

acquiring an image of the evaluation pattern to detect a second edge of the evaluation pattern;

dividing the first edge into first linear parts and first corner parts;

performing matching of the first and second edges to obtain correspondence between the first and second edges;

dividing the second edge into second linear parts and second corner parts based on the correspondence between the first and second edges; and evaluating the evaluation pattern based on at least one of the second linear parts and the second corner parts.

According to a second aspect of the present invention, there is provided a computer readable recording media containing a program which allows a computer to execute a pattern evaluation processing, the program comprising:

acquiring data of a design pattern for an evaluation pattern to detect a first edge of the design pattern;

acquiring an image of the evaluation pattern to detect a second edge of the evaluation pattern;

dividing the first edge into first linear parts and first corner parts;

performing matching of the first and second edges to obtain correspondence between the first and second edges;

dividing the second edge into second linear parts and second corner parts based on the correspondence between the first and second edges; and evaluating the evaluation pattern based on at least one of the second linear parts and the second corner parts.

According to a third aspect of the present invention, there is provided a manufacturing method of a semiconductor device comprising executing a manufacturing process of the semiconductor device with respect to a substrate when it is determined that a requested specification is satisfied as a result of evaluating an evaluation pattern formed on the substrate based on a pattern evaluation method, the pattern evaluation method includes:

acquiring data of a design pattern for an evaluation pattern to detect a first edge of the design pattern;

acquiring an image of the evaluation pattern to detect a second edge of the evaluation pattern;

dividing the first edge into first linear parts and first corner parts;

performing matching of the first and second edges to obtain correspondence between the first and second edges;

dividing the second edge into second linear parts and second corner parts based on the correspondence between the first and second edges; and evaluating the evaluation pattern based on at least one of the second linear parts and the second corner parts.

BRIEF DESCRIPTION OF THE DRAWINGS

In the accompanying drawings.

DETAILED DESCRIPTION OF THE INVENTION

Several embodiments according to the present invention will now be explained hereinafter with reference to the accompanying drawings. A case where an image of a fine pattern formed in a manufacturing process of a semiconductor device, e.g., a lithography process or an etching process is acquired by an imaging device, e.g., a CDSEM and this pattern image is evaluated will be taken as an example and explained hereinafter. However, the present invention is not restricted thereto, and it should be noted that the present invention can be applied to general pattern evaluation in other various industrial fields. It is also to be noted that a case where a top-down SEM image acquired by a CDSEM is used to evaluate an evaluation pattern will be taken as an example in the following embodiments, but the present invention is not restricted thereto and can be applied to an image acquired by any other device, e.g., an optical image acquisition device. However, since a pattern image must be acquired with a higher magnification in order to accurately evaluate a fine pattern of a semiconductor, using an SEM image is preferable at the present moment.

(1) First Embodiment

A first embodiment according to the present invention will now be explained with reference to FIGS. 1 to 7.

Figure 1:
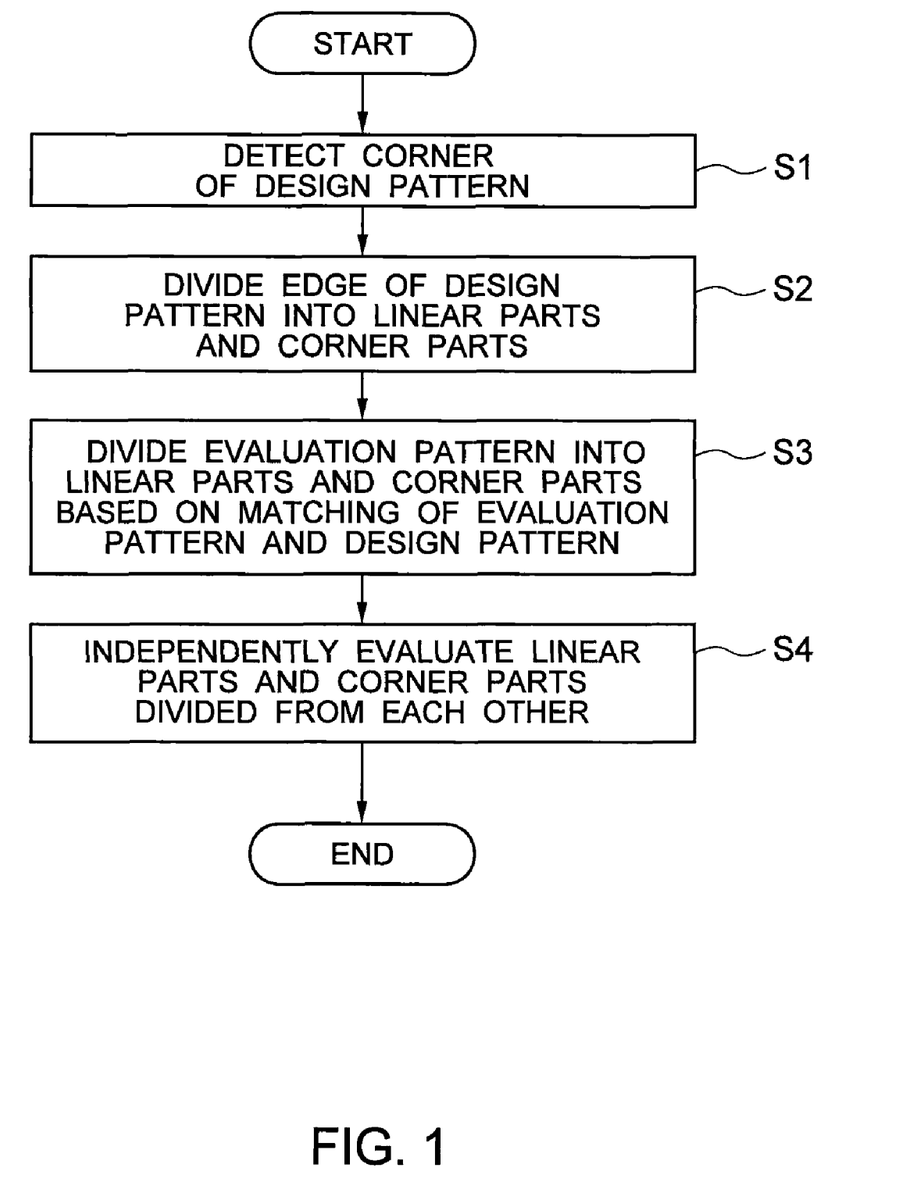
FIG. 1 is a flowchart for explaining an outline process of a pattern evaluation method according to a first embodiment of the present invention.
Figure 2:
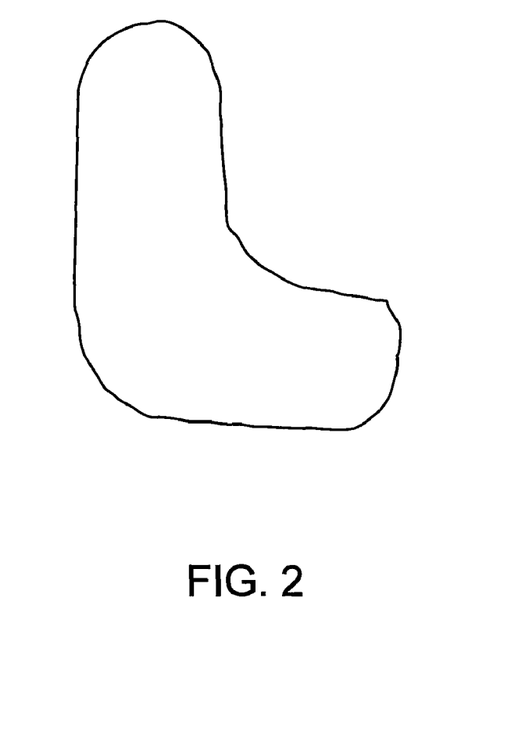
FIG. 2 is a view showing an example of an evaluation pattern.
Figure 3:
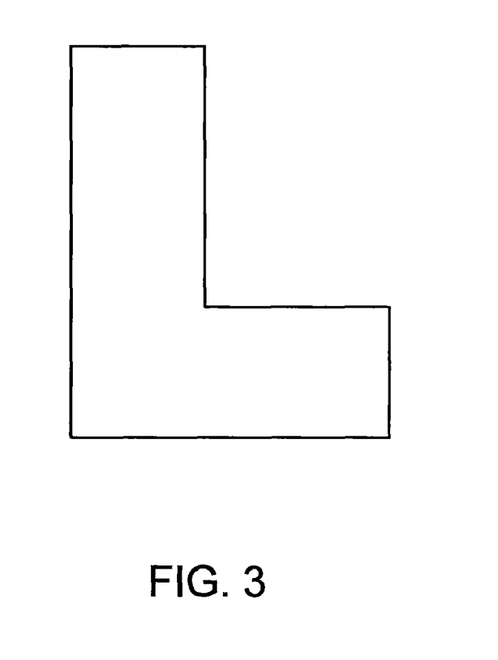
FIG. 3 is a view showing a design pattern of the evaluation pattern depicted in FIG. 2.

FIG. 1 is a flowchart for explaining an outline process of a pattern evaluation method according to this embodiment, FIG. 2 shows an example of an evaluation pattern, and FIG. 3 depicts a design pattern of the evaluation pattern illustrated in FIG. 2.

First, corner parts of a design pattern in FIG. 3 are detected (FIG. 1, a step S1). To achieve this detection, vertexes of a graphic in the design pattern are detected from design data. As a method of detecting vertexes, when the design data is supplied as a file such as GDS, since each vertex coordinate of a CAD (Computer Aided Design) graphic is written in this file, the vertexes can be read from this file. When a CAD graphic is given as image data in, e.g., a bitmap format obtained by spreading the GDS file, image processing for characteristic point detection must be used to detect the vertexes. Characteristic point detection is one of important element technologies in a machine vision technical field, and various methods have been already proposed, but just a cosine value judgment method is named herein. Of course, any other characteristic point detection methods can be used.

Figure 4:
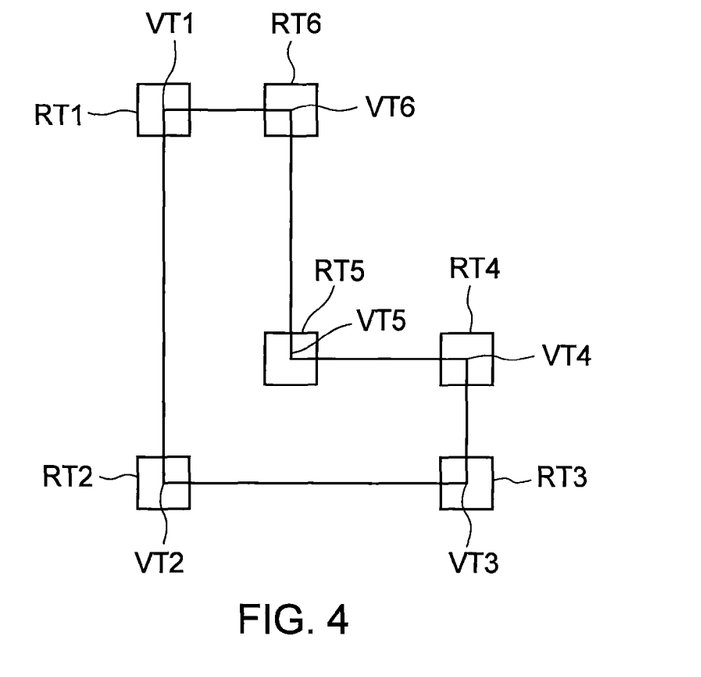
FIGS. 4 to 7 are explanatory views of the pattern evaluation method depicted in FIG. 1.
Figure 5:
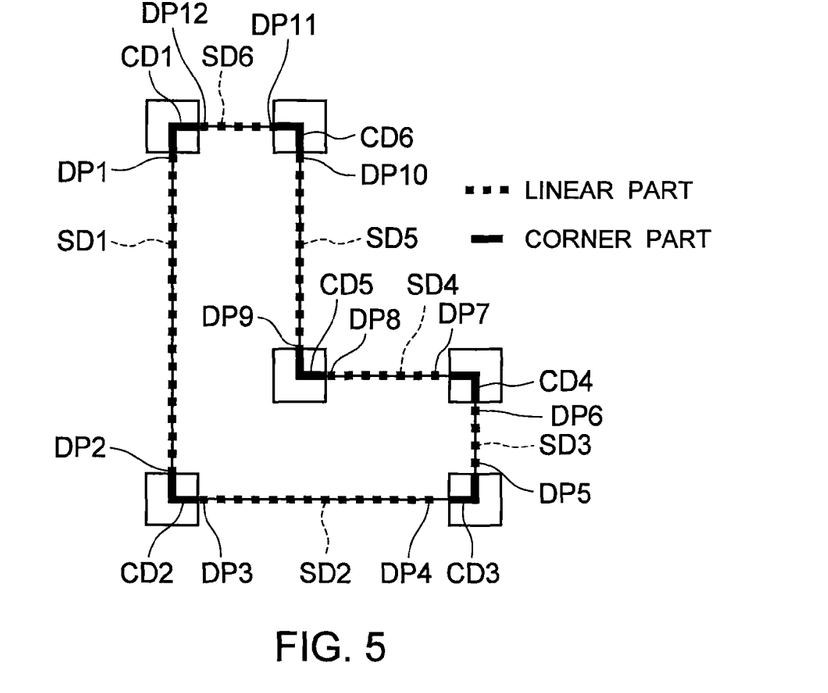

Then, as shown in FIG. 4, graphics each having a predetermined size, e.g., squares RT1 to RT6 are drawn with vertexes VT1 to VT6 of the CAD graphic extracted by one of the above-explained methods at the center, and an edge of the design pattern is divided into linear parts SD1 to SD6 and corner parts CD1 to CD6 (FIG. 1, a step S2). A size of the square is adjusted based on a size of the entire pattern. In this embodiment, each square RT whose one side is 10 nm is used. As a result, intersections of the squares RT1 to RT6 and the edge of the CAD graphic are determined as a boundary, and the inner sides of the squares are determined as the corner parts CD1 to CD6 whilst the outer sides of the same are determined as the linear parts SD1 to SD6 to enable dividing the edge of the CAD graphic as shown in FIG. 5. Although the square RT is used to detect each corner part in this embodiment, the present invention is not restricted to this shape, and a graphic having any other shape, e.g., a rectangular shape, a circle, or an ellipse can be used.

Then, the evaluation pattern is divided into the linear parts and the corner parts based on matching of the evaluation pattern and the design pattern (FIG. 1, a step S3). First, processing of matching the evaluation pattern depicted in FIG. 2 with the design pattern shown in FIG. 3 is executed. In this embodiment, distance matching proposed in Japanese Patent Application Laid-open No. 2006-275952 will be taken as an example and explained. The entire contents of Japanese Patent Application Laid-open No. 2006-275952 are herein incorporated in this specification by reference. In distance matching, an edge of an evaluation pattern must be detected prior to matching. Although various methods are proposed as a method of detecting an edge, this embodiment adopts a method proposed in Japanese Patent Application Laid-open No. 2003-178314 characterized in that even an entire edge of a complicated pattern can be rapidly and accurately detected without a manual assist, e.g., setting of an ROI (Region of Interest). The entire contents of Japanese Patent Application Laid-open No. 2003-178314 are also herein incorporated in this specification by reference.

Subsequently, matching of the thus detected edge of the evaluation pattern and the edge of the CAD graphic written in the design data is executed. In the distance matching processing adopted in this embodiment, a relative position of a distance map obtained by distance-conversion of the edge of the CAD graphic into a distance and the edge of the evaluation pattern is operated, a value obtained by an image arithmetic operation of the distance map, and edge data at this relative position is determined as a matching score, and a relative position where the value of the matching score becomes maximum is output as a matching coordinate. It is to be noted that the distance matching technique is used for positioning of the two patterns in this embodiment, but any other matching technique can be used.

Subsequently, processing of associating the edges of both the patterns with each other is executed. Although various methods can be considered to realize this processing, this embodiment uses a technique of robust point matching proposed in a paper "Haili Chui, An and Rangarajan, A new algorithm for non-rigid point matching, IEEE Conference on Computer Vision and Pattern Recognition (CVPR), volume II, 44-51, 2000".

Figure 6:
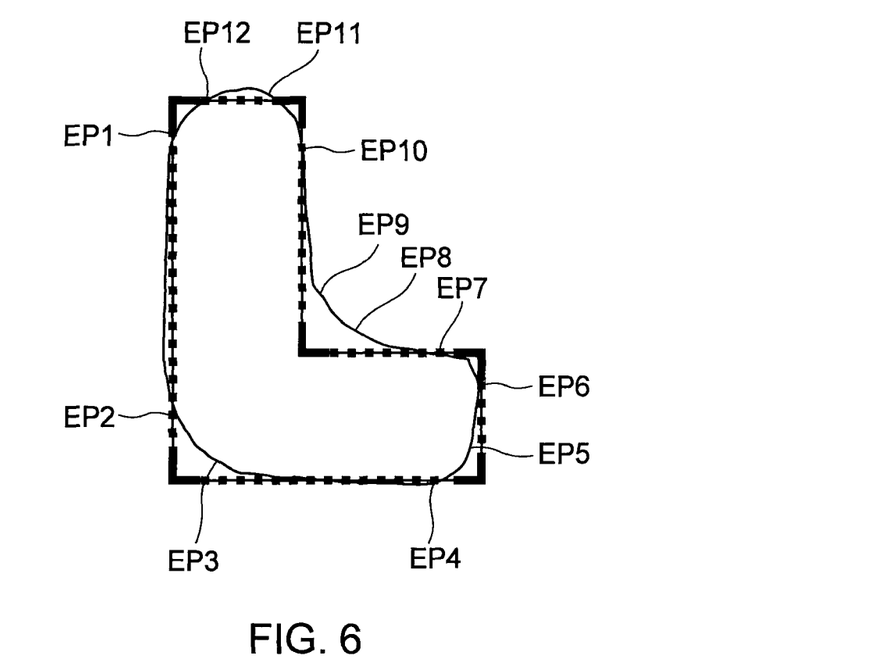

FIG. 6 shows a result obtained by performing such association. In the drawing, two points at both ends of each dotted line (EP1, EP2), (EP3, EP4), (EP5, EP6), (EP7, EP8), (EP9, EP10), or (EP11, EP12) correspond to two points associated with division points (DP1, DP2), (DP3, DP4), (DP5, DP6), (DP7, DP8), (DP9, DP10), or (DP11, DP12) depicted in FIG. 5, and are placed at equivalent positions on the two edges of the evaluation pattern and the design pattern. Furthermore, a sum total of lengths between ends of the respective point pairs represent a difference between the two patterns.

Figure 7:
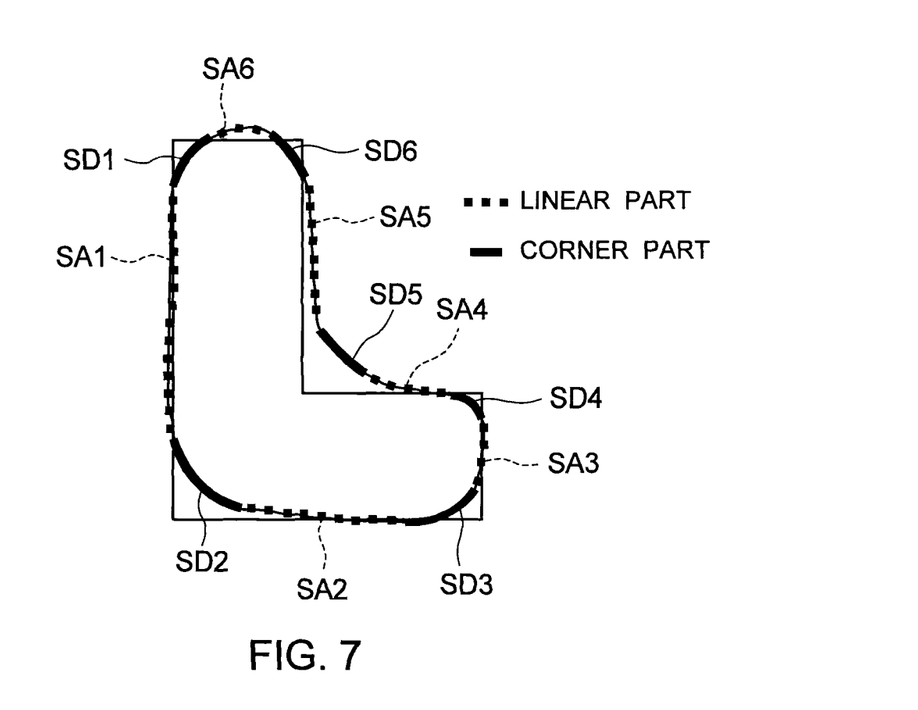

When the points EP1 to EP12 on the evaluation pattern associated with the points DP1 to DP12 at which the CAD pattern is divided into the linear parts and the corner parts are determined as division points in this manner, the evaluation pattern edge can be divided into linear parts SA1 to SA6 and corner parts of CA1 to CA6 as shown in FIG. 7. The divided evaluation patterns can be subjected to different evaluation methods (FIG. 1, a step S4). In this embodiment, the linear parts SA1 to SA6 are subjected to roughness measurement, and the corner parts CA1 to CA6 are subjected to corner rounding measurement, thereby accurately performing pattern evaluation. As a measurement method for roughness or corner rounding, any existing method can be used. Respective averages or individual values of a plurality of thus obtained roughness and corner rounding measurement results for the evaluation pattern can be used as pattern evaluation indices.

(2) Second Embodiment

Figure 8:
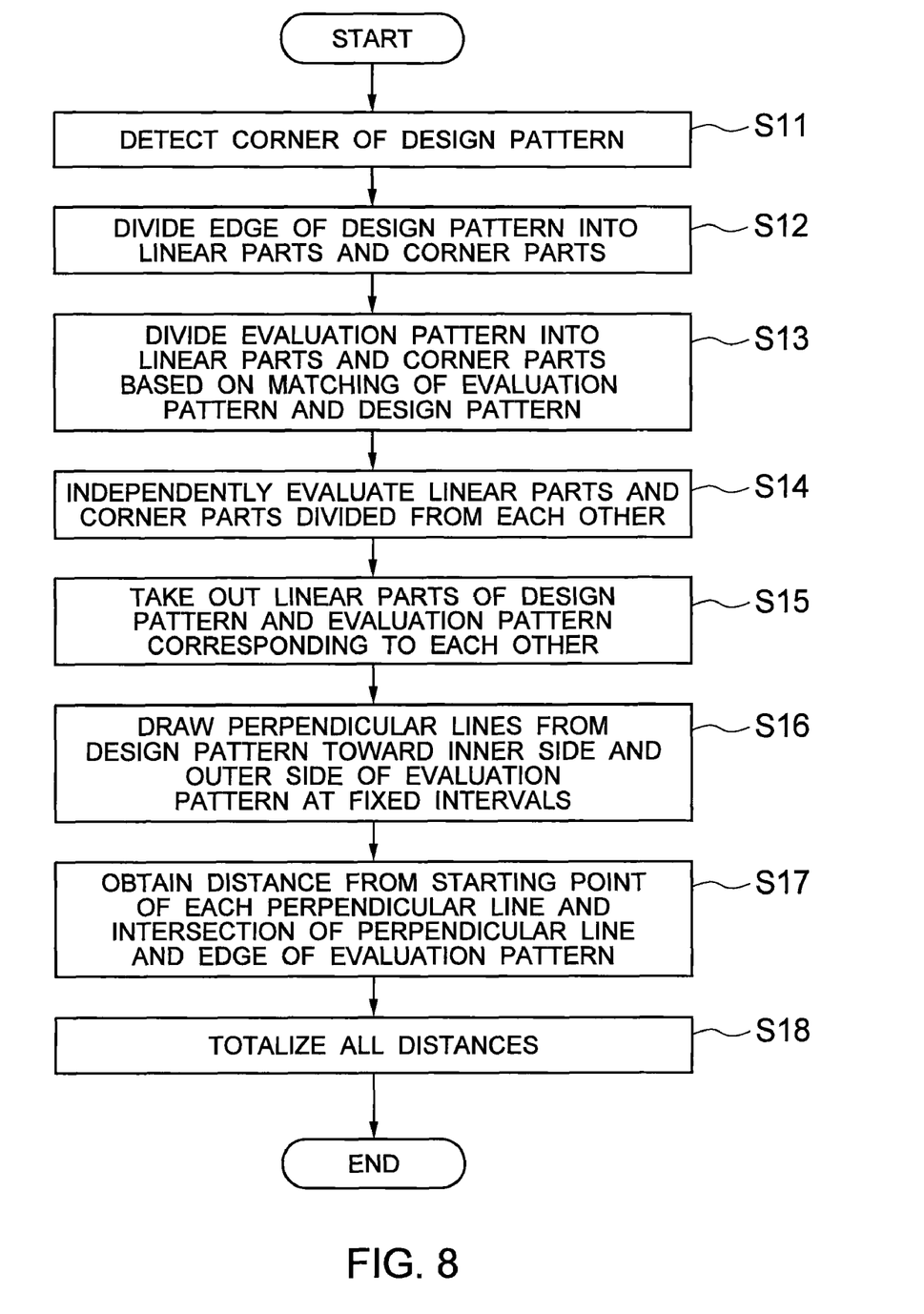
FIG. 8 is a flowchart for explaining an outline process of a pattern evaluation method according to a second embodiment of the present invention.
Figure 9:
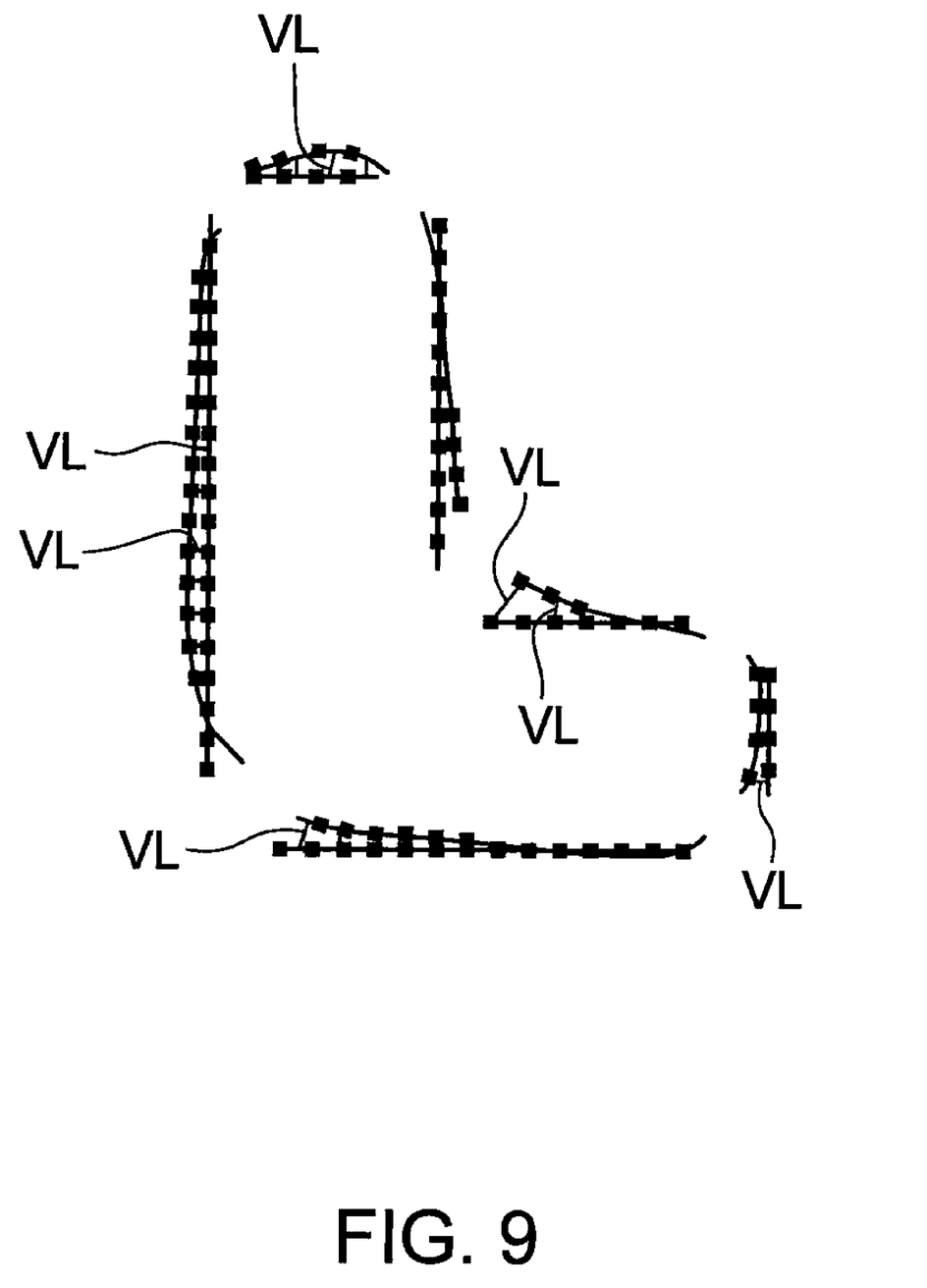
FIG. 9 is an explanatory view of the pattern evaluation method depicted in FIG. 8.

A second embodiment according to the present invention will now be explained with reference to FIGS. 8 and 9. FIG. 8 is a flowchart for explaining an outline process of a pattern evaluation method according to this embodiment, and FIG. 9 is an explanatory view of the pattern evaluation method depicted in FIG. 8.

In this embodiment, a case where a difference between a CAD pattern written in design data of a semiconductor pattern and an evaluation pattern is used as an evaluation index of the evaluation pattern will be taken as an example to be explained.

First, the method explained in the first embodiment is used to divide the evaluation pattern into linear parts and corner parts (FIG. 8, steps S11 to S14). In case of a semiconductor pattern, a pattern shape of a product generally greatly deviates from a CAD shape. The pattern is rounded especially at corner parts because of a restriction in, e.g., an optical resolution in pattern manufacture or a resolution of pattern transfer properties. Therefore, when using a difference from a CAD pattern as an evaluation index, it is desirable to divide an evaluation pattern into corner parts and linear parts and calculating a difference from a design pattern based on the linear parts only in the pattern. A sum total of distances between associated points on an edge divided as the linear parts may be output as a difference, but calculation is performed in accordance with the process depicted in FIG. 8 when measuring a difference in the linear parts in the pattern in this embodiment.

First, corresponding linear parts are taken out from the design pattern and the evaluation pattern (a step S15). Giving an explanation on the example according to the first embodiment, the linear parts SD1 to SD6 in the CAD pattern depicted in FIG. 5 and the linear parts SA1 to SA6 in the actual pattern shown in FIG. 7 are taken out.

Then, perpendicular lines VL are drawn from the design pattern toward the inner side and the outer side of the evaluation pattern at fixed intervals (FIG. 8, a step S16). FIG. 9 shows an example of the result.

Subsequently, a distance from a starting point of each perpendicular line VL on the design pattern to a point where this perpendicular line VL crosses the edge of the evaluation pattern is obtained (FIG. 8, a step S17). At this time, a sign is set to a positive sign when the intersection is present on the outer side of the pattern, and the sign is set to a negative sign when the intersection is present on the inner side of the same. When the intersection is not found within a fixed distance, the distance is set to zero.

At last, all the distances are added (a step S18).

As explained above, according to this embodiment, a value obtained by eliminating an influence of each corner part from a difference between the CAD pattern and the evaluation pattern can be accurately calculated in the above-explained process.

(3) Program

A series of processes in the pattern evaluation method according to the foregoing embodiment may be incorporated in a program executed by a computer, accommodated in a recording medium such as a flexible disk or a CD-ROM, and read and executed by the computer. As a result, the pattern evaluation method according to the present invention can be realized by using a general-purpose computer capable of executing image processing. The recording medium is not restricted to a portable medium, e.g., a magnetic disk or an optical disk, and a fixed type recording medium such as a hard disk drive or a memory may be used. Furthermore, a program having the above-explained series of processes in the pattern evaluation method incorporated therein may be distributed through a communication line, e.g., the Internet (including wireless communication). Moreover, a program having the series of processes in the pattern evaluation method incorporated therein may be encrypted, modulated, or compressed, and it may be distributed through a wire cable or a wireless line, e.g., the Internet or may be accommodated in a recording medium to be distributed in this state.

(4) Manufacturing Method of Semiconductor Device

Using the above-explained pattern evaluation method in the manufacturing process of a semiconductor device enables highly accurately evaluating a pattern in a short time, thereby manufacturing a semiconductor device with a higher yield ratio and a higher throughput.

More specifically, a substrate is sampled in units of production lot, and a pattern formed on the sampled substrate is evaluated based on the above-explained pattern evaluation method. When the pattern is determined as a non-defective pattern beyond a threshold value set based on a product specification as a result of the evaluation, the remaining manufacturing processes are continuously performed with respect to the entire production lot to which the substrate having the evaluated pattern formed thereon belongs. On the other hand, when the pattern is determined as a defective pattern as a result of the evaluation, rework processing is executed with respect to the production lot to which the substrate having the pattern determined as the defective pattern formed thereon belongs to if the rework processing is possible. When the rework processing is finished, a substrate is again sampled from this production lot to again evaluate a pattern. When the substrate sampled for reevaluation of the pattern is determined as a non-defective product, the remaining manufacturing processes are performed with respect to this production lot subjected to the rework processing. Additionally, when the rework processing is impossible, the production lot to which the substrate having the pattern determined as a defective pattern formed thereon belongs is discarded and, if a defect occurrence factor can be analyzed, a result of this analysis is fed back to a person in charge of design or a person in charge of upstream processes.

What is claimed is:

1. A pattern evaluation method comprising:
acquiring data of a design pattern for an evaluation pattern to detect a first edge of the design pattern;
acquiring an image of the evaluation pattern to detect a second edge of the evaluation pattern;
dividing the first edge into first linear parts and first corner parts;
performing matching of the first and second edges to obtain correspondence between the first and second edges;
associating second edge points of the second edges with first edge points of the first edges on the basis of the correspondence, the first edge points dividing the first edge into the first linear parts and the first corner parts;
dividing the second edge into second linear parts and second corner parts using the associated second edge points; and
evaluating the evaluation pattern based on at least one of the second linear parts and the second corner parts.

2. The pattern evaluation method according to claim 1, wherein the evaluating the evaluation pattern includes evaluating the second linear parts and the second corner parts independently.

3. The pattern evaluation method according to claim 2, wherein the second linear parts are evaluated based on roughness measurements.

4. The pattern evaluation method according to claim 2, wherein the second corner parts are evaluated based on corner rounding measurements.

5. The pattern evaluation method according to claim 1, wherein the matching is performed by using a technique of distance matching.

6. The pattern evaluation method according to claim 1, wherein the dividing the first edge includes:
detecting vertexes of the design pattern;
drawing a predetermined pattern with each detected vertex at the center thereof; and
determining an intersection between the first edge and the predetermined pattern as a boundary, determining an edge belonging to the inner side of the predetermined pattern as the first corner parts, and determining an edge belonging to the outer side of the predetermined pattern as the first linear parts.

7. The pattern evaluation method according to claim 1, wherein the evaluating the evaluation pattern includes calculating a difference between the design pattern and the evaluation pattern from the second linear parts only.

8. The pattern evaluation method according to claim 7, wherein the calculating the difference includes:
extracting the first and second linear parts corresponding to each other;
drawing perpendicular lines from the design pattern toward the inner side or the outer side of the evaluation pattern at predetermined intervals;
obtaining a distance from a starting point of each perpendicular line to an intersection of the perpendicular line and the second edge; and
calculating a sum total of all the distances.

9. The pattern evaluation method according to claim 8, wherein a positive sign is given to the distance when the intersection is placed on the outer side of the design pattern;
a negative sign is given to the distance when the intersection is placed on the inner side of the design pattern; and
the distance is determined as zero when no intersection is found within a predetermined distance.

10. A computer readable recording media containing a program which allows a computer to execute a pattern evaluation processing, the program comprising:
acquiring data of a design pattern for an evaluation pattern to detect a first edge of the design pattern;
acquiring an image of the evaluation pattern to detect a second edge of the evaluation pattern;
dividing the first edge into first linear parts and first corner parts;
performing matching of the first and second edges to obtain correspondence between the first and second edges;
associating second edge points of the second edges with first edge points of the first edges on the basis of the correspondence, the first edge points dividing the first edge into the first linear parts and the first corner parts;
dividing the second edge into second linear parts and second corner parts using the associated second edge points; and
evaluating the evaluation pattern based on at least one of the second linear parts and the second corner parts.

11. The recording media according to claim 10, wherein the evaluating the evaluation pattern includes evaluating the second linear parts and the second corner parts independently.

12. The recording media according to claim 11, wherein the second linear parts are evaluated based on roughness measurements.

13. The recording media according to claim 11, wherein the second corner parts are evaluated based on corner rounding measurements.

14. The recording media according to claim 10, wherein the dividing the first edge includes:
detecting vertexes of the design pattern;
drawing a predetermined pattern with each detected vertex at the center thereof; and
determining an intersection between the first edge and the predetermined pattern as a boundary, determining an edge belonging to the inner side of the predetermined pattern as the first corner parts, and determining an edge belonging to the outer side of the predetermined pattern as the first linear parts.

15. The recording media according to claim 10, wherein the evaluating the evaluation pattern includes calculating a difference between the design pattern and the evaluation pattern from the second linear parts only.

16. The recording media according to claim 15, wherein the calculating the difference includes:
extracting the first and second linear parts corresponding to each other;
drawing perpendicular lines from the design pattern toward the inner side or the outer side of the evaluation pattern at predetermined intervals;
obtaining a distance from a starting point of each perpendicular line to an intersection of the perpendicular line and the second edge; and
calculating a sum total of all the distances.

17. A manufacturing method of a semiconductor device comprising executing a manufacturing process of the semiconductor device with respect to a substrate when it is determined that a requested specification is satisfied as a result of evaluating an evaluation pattern formed on the substrate based on a pattern evaluation method, the pattern evaluation method comprises:

acquiring data of a design pattern for an evaluation pattern to detect a first edge of the design pattern;

acquiring an image of the evaluation pattern to detect a second edge of the evaluation pattern;

dividing the first edge into first linear parts and first corner parts;

performing matching of the first and second edges to obtain correspondence between the first and second edges;

associating second edge points of the second edges with first edge points of the first edges on the basis of the correspondence, the first edge points dividing the first edge into the first linear parts and the first corner parts;

dividing the second edge into second linear parts and second corner parts using the associated second edge points; and evaluating the evaluation pattern based on at least one of the second linear parts and the second corner parts.

18. The manufacturing method according to claim 17, wherein the evaluating the evaluation pattern includes evaluating the second linear parts and the second corner parts independently.

19. The manufacturing method according to claim 17, wherein the evaluating the evaluation pattern includes calculating a difference between the design pattern and the evaluation pattern from the second linear parts only.

20. The manufacturing method according to claim 19, wherein the calculating the difference includes:

extracting the first and second linear parts corresponding to each other;

drawing perpendicular lines from the design pattern toward the inner side or the outer side of the evaluation pattern at predetermined intervals;

obtaining a distance from a starting point of each perpendicular line to an intersection of the perpendicular line and the second edge; and calculating a sum total of all the distances.

* * * * *